United States Patent
Back et al.

(10) Patent No.: US 7,673,999 B2
(45) Date of Patent: Mar. 9, 2010

(54) BACKLIGHT UNIT AND LIQUID CRYSTAL DISPLAY MODULE INCLUDING THE SAME

(75) Inventors: Seung-Cheol Back, Daegu (KR); Kang-ju Lee, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 147 days.

(21) Appl. No.: 11/987,065

(22) Filed: Nov. 27, 2007

(65) Prior Publication Data

US 2008/0143920 A1 Jun. 19, 2008

(30) Foreign Application Priority Data

Dec. 13, 2006 (KR) .................. 10-2006-0126937
Dec. 22, 2006 (KR) .................. 10-2006-0132847
Nov. 6, 2007 (KR) .................. 10-2007-0112534

(51) Int. Cl.
*F21V 23/02* (2006.01)

(52) U.S. Cl. .............. 362/97.2; 362/217.11; 362/221; 362/631

(58) Field of Classification Search ........... 362/97.1, 362/97.2, 221, 225, 561, 630, 631, 632, 633, 362/634; 439/44, 45, 56, 65; 361/784
See application file for complete search history.

(56) References Cited

U.S. PATENT DOCUMENTS

| | | | |
|---|---|---|---|
| 5,064,276 A | 11/1991 | Endo et al. | |
| 7,184,658 B2 * | 2/2007 | Squillace | 362/13 |
| 7,527,406 B2 * | 5/2009 | Kwon et al. | 362/632 |
| 2004/0001340 A1 | 1/2004 | Shin | |
| 2004/0252481 A1 | 12/2004 | Moon | |
| 2005/0226002 A1 | 10/2005 | Aoki et al. | |
| 2005/0243260 A1 | 11/2005 | Kim | |
| 2006/0023471 A1 | 2/2006 | Ahn et al. | |
| 2006/0170840 A1 | 8/2006 | Park et al. | |
| 2006/0238987 A1 | 10/2006 | Park et al. | |
| 2006/0273739 A1 | 12/2006 | Park | |
| 2007/0189041 A1 * | 8/2007 | Chen et al. | 362/631 |

FOREIGN PATENT DOCUMENTS

| | | |
|---|---|---|
| CN | 1758103 A | 4/2006 |
| CN | 1704810 A | 12/2006 |

* cited by examiner

*Primary Examiner*—Y My Quach Lee
(74) *Attorney, Agent, or Firm*—Holland & Knight LLP

(57) ABSTRACT

A backlight unit for a display device includes a frame; a first circuit board extending along one end of and on a first surface of the frame; lamps over the frame, one end of each of the lamps disposed on the first circuit board; a first line on the first circuit board and connected to the one end of each of the lamps; and a first inverter on a second surface of the frame and connected to the first line via a first hole through the frame.

18 Claims, 12 Drawing Sheets

BACKLIGHT UNIT AND LIQUID CRYSTAL DISPLAY MODULE INCLUDING THE SAME

The present invention claims the benefit of Korean Patent Application Nos. 10-2006-0126937, 10-2006-0132847 and 10-2007-0112534, filed in Korea on Dec. 13, 2006, Dec. 22, 2006 and Nov. 6, 2007, respectively, all of which are hereby incorporated by reference in their entirety.

BACKGROUND OF THE INVENTION

1. Field of the Invention

Embodiments of the invention relate to a liquid crystal display module (LCDM), and more particularly, to a backlight unit and an LCDM including the same.

2. Discussion of the Related Art

LCD devices include an LCD module. The LCD module includes an LCD panel that displays images and a backlight unit that supplies light to the LCD panel. The LCD panel includes two substrates facing each other and spaced apart from each other. A liquid crystal material is interposed therebetween. Liquid crystal molecules of the liquid crystal material have a dielectric constant and refractive index anisotropic characteristic due to their long thin shape. Two electric field generating electrodes are formed on the two substrates, respectively. An orientation alignment of the liquid crystal molecules may be controlled by supplying a voltage to the two electrodes to change the light transmittance of the LCD panel according to polarization properties of the liquid crystal material.

Generally, an additional light source is required because the LCD panel is a non-emissive-type display device. Accordingly, a backlight unit is disposed under the LCD panel. The LCD device displays images using light produced by the backlight unit and supplied to the LCD panel. Backlight units may be classified into a side-type backlight unit and a direct-type backlight unit in accordance with a disposition of the light source. The side-type backlight unit has one lamp or a pair of lamps disposed at a side portion of a light guide plate. Alternatively, at least one lamp is disposed at each side portion of the light guide plate, respectively.

The direct-type backlight unit has a plurality of lamps disposed under the light guide plate. In a large sized LCD module, the direct-type backlight unit may provide the LCD module with a uniform light source although the side-type backlight unit is more easily manufactured than the direct-type. Further, the direct-type backlight unit includes a plurality of fluorescent lamps disposed in a row. Thus, the direct-type backlight unit directly irradiates light toward the liquid crystal panel. Since the direct-type backlight unit has a high uniformity when light is irradiated, it is suitable to be applied to a large-size LCD. The light guide plate is unnecessary in the direct-type backlight unit because the direct-type backlight unit is directly irradiated on the entire surface of the liquid crystal panel. In particular, the direct-type backlight unit has advantages that light efficiency is high, the use is convenient, the display size is not substantially limited. For example, the direct-type backlight unit may be utilized in a large-size LCD such as a 20-inch model.

Generally, the liquid crystal panel and the backlight unit are combined with each other using a main frame, a top frame and a bottom frame to prevent light-loss and to protect them from outside impact.

FIG. 1 is a perspective view of an inverter unit connected to a backlight unit of an LCDM according to the related art. Referring to FIG. 1, a direct-type backlight unit includes a plurality of fluorescent lamps 24 disposed in a row on a bottom frame 50, and a reflective sheet 22 disposed under the plurality of fluorescent lamps 24 and on the bottom frame 50. A side support 33 for supporting the fluorescent lamps 24 is disposed at one end portion of the bottom frame 50. The end portion of each of the fluorescent lamps 24 is inserted into a lamp holder 32. In addition, the lamp holder 32 is inserted into an opening of the side support 33. Although not shown, an other side support (not shown) is disposed at the other end portions of the fluorescent lamps 24.

A plurality of wires 37, which are connected to an external circuit, extend from end portions of the plurality of fluorescent lamps 24 to a backside of the bottom frame 50, respectively. With respect to one of the wires 37, a socket connector 38a is formed at one end portion of the wire 37 to connect the wire 37 and the inverter unit 70. The inverter unit 70 is disposed under the bottom frame 50 and provides a power supply to the fluorescent lamps 24. The inverter unit 70 includes a plurality of inverters (not shown), a plug connector 38b connecting the wire 37 and the inverter unit 70, and an inverter PCB 35 on which the inverters and the plug connector 38b are mounted. A cover shield (not shown) protects the inverter unit 70 from an external impact. By combining the socket connector 38a and the plug connector 38b, a power source of the inverter unit 70 can be provided to the fluorescent lamp 24 through the wire 37. Because the wire 37 extends from the end portion of the fluorescent lamp 24 on a front side of the bottom frame 50 to a backside of the bottom frame 50, neither the bottom frame 50 nor cover shield (not shown) covers the wire 37 such that the current leakage can be generated from the wire 37. Moreover, the necessity of soldering each of the plurality of fluorescent lamps 24 independently to each of the wires 37 increases the manufacturing time.

The fluorescent lamp 24 emits light when an alternating current waveform of a high voltage is applied to an electrode of the fluorescent lamp 24 through the wire 37 connected to the electrode of the fluorescent lamp 24. In FIG. 1, a high-low type fluorescent lamp 24 including a ground portion at an end portion thereof is illustrated.

The high-low type fluorescent lamp 24 includes at least two fluorescent lamps 24 forming a pair of fluorescent lamps 24. The end portion of the fluorescent lamp 24 is inserted into a lamp holder 32, and the fluorescent lamp 24 is electrically connected to the inverter unit 70 through wire 37. The wire 37 extends to the backside of the bottom frame 50, and an end portion of the wire 37 is connected to the socket connector 38a. Here, the inverter unit 70, which changes a direct voltage into an alternating current of a high voltage, is required because the alternating current of the high voltage is demanded for driving the fluorescent lamp 24.

Accordingly, the inverter unit 70 and the inverter PCB 35 are independent from each other, and the inverter unit 70 is mounted on the inverter PCB 35. Since the inverter unit 70 dissipates a lot of heat, the inverter PCB 35 on which the inverter unit 70 is mounted is disposed on the backside of the bottom frame 50. The plug connector 38b is disposed on the inverter PCB 35 for being connected to the socket connector 38a. That is, the fluorescent lamp 24 is connected to the inverter PCB 35 by connecting the socket connector 38a to the plug connector 38b.

The wires 37 are exposed along edges and the backside of the bottom frame 50 because the fluorescent lamps 24 and the inverter unit 70 are connected to each other using the wires 37 forming a bridge between the fluorescent lamps 24 and the inverter unit 70. Thus, even if the inverter unit 70 is bent toward the backside of the bottom frame 50, the wires 37 are still exposed along edges and the backside of the bottom frame 50. Further, defects due to an electric interference between the exposed wires 37 or current leakage may occur. Furthermore, a crack between the fluorescent lamp 24 and the wires 37 at the soldering portion may be occur. Accordingly, emission of the fluorescent lamps 24 cannot occur uniformly.

FIG. 2 is an exploded portion of region "IIa" in FIG. 1 according to the related art. In FIG. 2, a fluorescent lamp 24 is connected to a wire 37, and the socket connector 38*a* is connected to an end portion of the wire 37. Generally, the fluorescent lamp 24 and the wire 37 are manually soldered to each other, as shown in part "IIb" in FIG. 2. The process time and the process cost increase because of the manual soldering. Furthermore, the material cost of the wire 37 increases because individual wires 37 are used for each fluorescent lamp 24. Further, the socket connector 38*a* is connected to an end portion of the wire 37 for connecting the inverter unit 70 of FIG. 1.

FIG. 3 is a lamp holder portion of a backlight unit for the LCDM of FIG. 1 according to the related art. Referring to FIG. 3, the related art LCDM of FIG. 1 requires a lamp holder 32 to hold the fluorescent lamp 24 at the bottom frame 50 of FIG. 1.

The fluorescent lamp 24 may be one of a cold cathode fluorescent lamp (CCFL) having internal electrodes and an external electrode fluorescent lamp (EEFL) having external electrodes. When the direct-type backlight unit including CCFL is driven by a parallel driving method using one inverter, there is problem that only part of the fluorescent lamps are driven properly due to differences in the charge characteristics of CCFLs. Although CCFLs have the same unlimited resistant value before charging, CCFLs can have different small resistant values when charged due to different conductor state plasmas that are generated inside of the glass tubes of each of the CCFLs. Accordingly, the resistant values of CCFLs after charging can be substantially different. Therefore, when a plurality of CCFLs are driven by a parallel driving method, more current flows in the fluorescent lamps having smaller resistant value after a primary charge. Accordingly, there is a problem in that some of the CCFLs will not be driven properly. Consequently, the direct-type backlight unit including CCFLs should include a number of inverters corresponding to the number of fluorescent lamps so that there is a one-to-one driving of the CCFLs.

SUMMARY OF THE INVENTION

Accordingly, embodiments of the invention are directed to a backlight unit and an LCDM including the same that substantially obviate one or more of the problems due to limitations and disadvantages of the related art.

An object of the invention is to prevent a current leakage resulted from a wire for connecting a fluorescent lamp to an inverter in a backlight unit of an LCDM.

Another object of the invention is to provide a backlight unit that uniformly emits light without an auxiliary element.

Another object of the invention is to reduce the number of wires in a backlight unit of LCDM.

Another object of the invention is to reduce the number of inverters in a backlight unit of an LCDM.

Another object of the invention is to reduce a process time and a process cost for fabricating a backlight unit of an LCDM.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a backlight unit for a display device includes: a frame; a first circuit board extending along one end of and on a first surface of the frame; lamps over the frame, one end of each of the lamps disposed on the first circuit board; a first line on the first circuit board and connected to the one end of each of the lamps; and a first inverter on a second surface of the frame and connected to the first line via a first hole through the frame.

In another aspect, a liquid crystal display module includes: a liquid crystal panel; a backlight unit for projecting light on the liquid crystal panel, the backlight unit having a first frame, a first circuit board extending along one end of and on a first surface of the first frame, lamps over the first frame, one end of each of the lamps is disposed on the first circuit board, a first line on the first circuit board and connected to the one end of each of the lamps, and an inverter connected to the first line via a first hole through the first frame; and a power supplying unit on a second surface of the first frame for supplying power to the liquid crystal panel, wherein the inverter is disposed on the power supplying unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
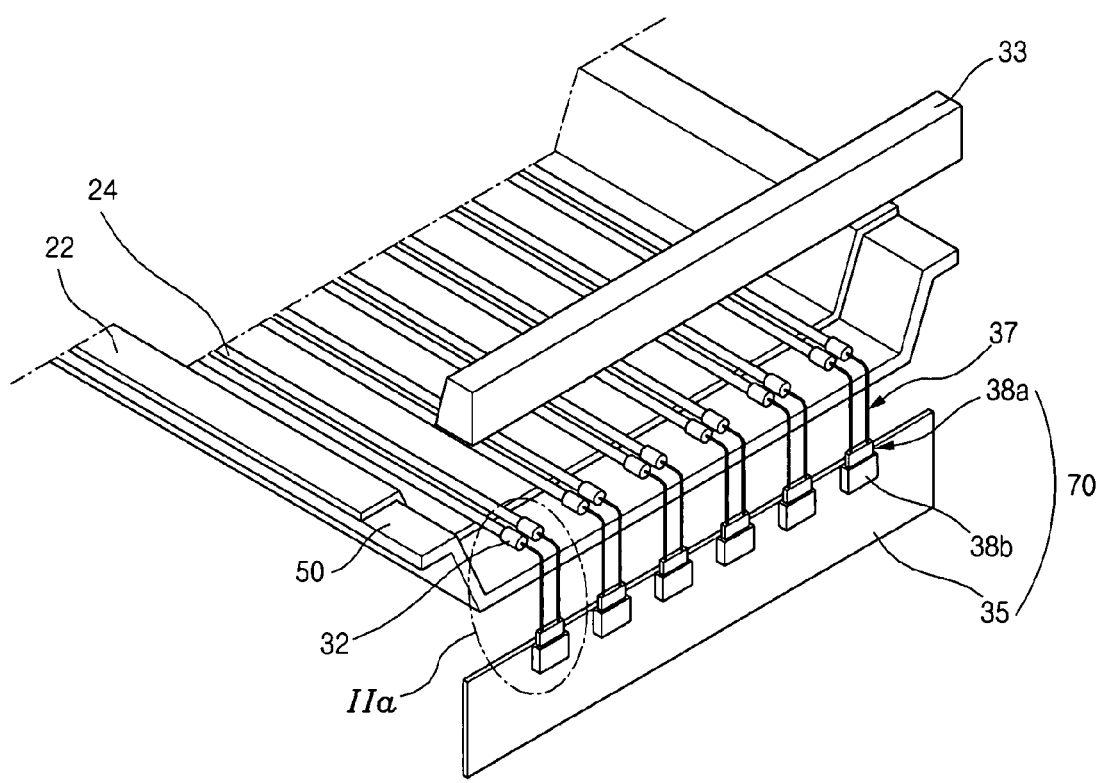
FIG. 1 is a perspective view of an inverter unit connected to a backlight unit of an LCDM according to the related art.
Figure 2:
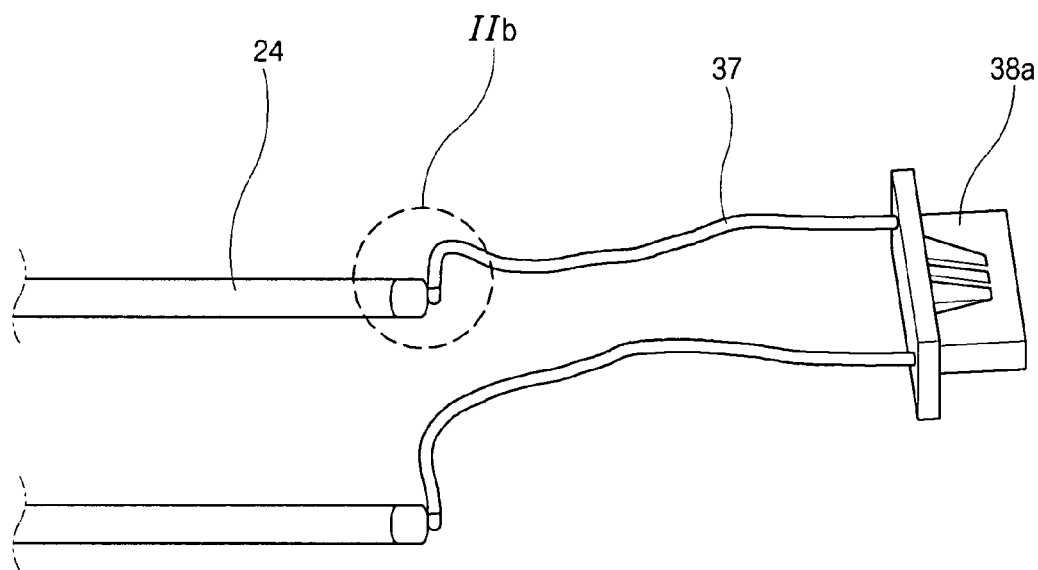
FIG. 2 is an exploded portion of region "IIa" in of FIG. 1 according to the related art.
Figure 3:
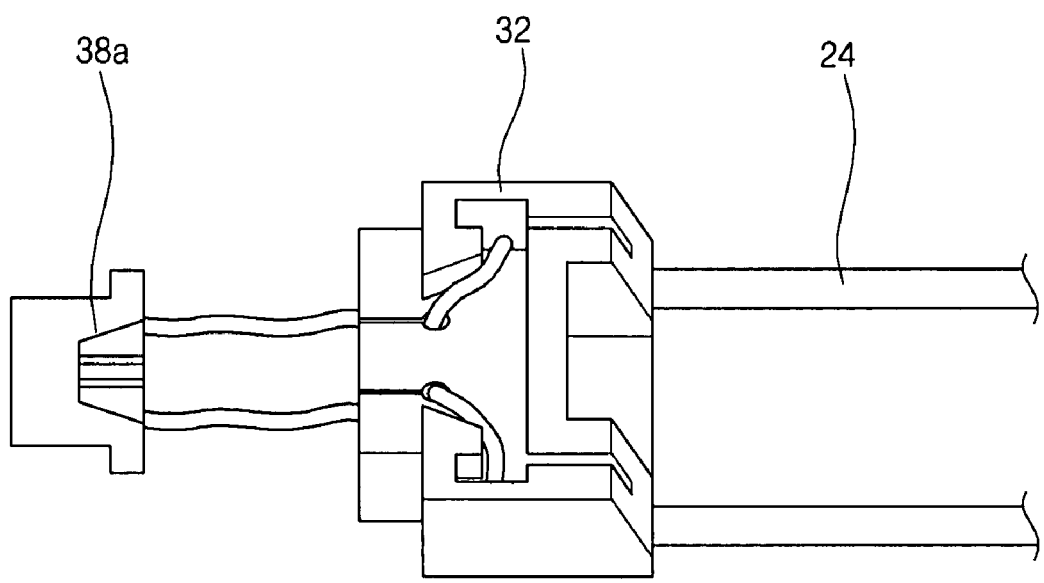
FIG. 3 is a lamp holder portion of a backlight unit for the LCDM of FIG. 1 according to the related art.
Figure 4:
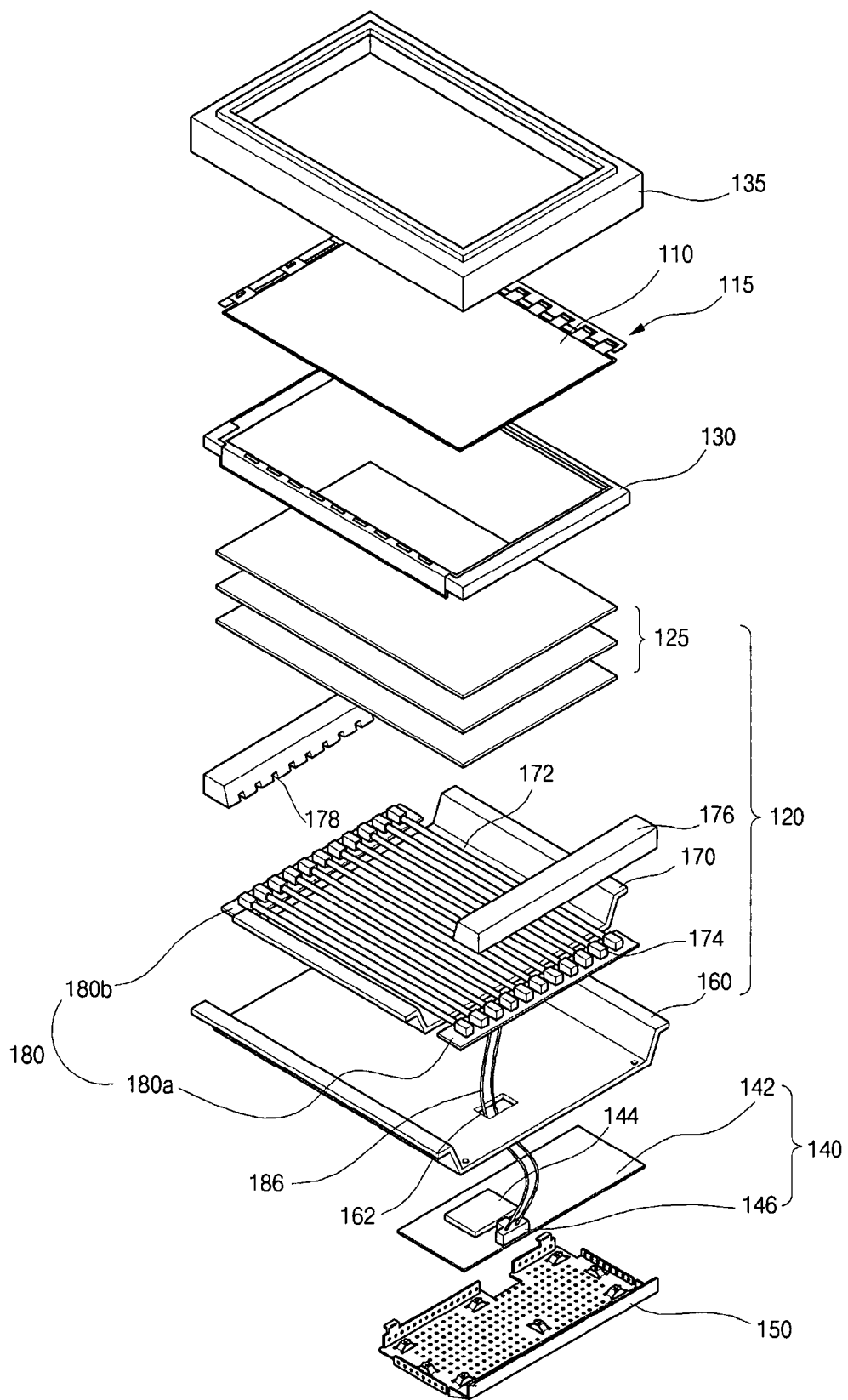
FIG. 4 is an exploded perspective view of a liquid crystal display module (LCDM) with a backlight unit according to an embodiment of the invention.

FIG. 4 is an exploded perspective view of a liquid crystal display module (LCDM) with a backlight unit according to an embodiment of the invention. Referring to FIG. 4, an LCDM includes a liquid crystal panel 110, a backlight unit 120, a main frame 130, a top frame 135, and a bottom frame 160, an inverter unit 140, and a cover shield 150. The liquid crystal panel 110 includes first and second substrates (not shown) facing each other and a liquid crystal layer therebetween. The liquid crystal panel 110 is connected to gate and data printed circuit boards (PCBs) 115 that provide a scanning signal and an image signal to the liquid crystal panel 10, respectively.

The backlight unit 120 may be a direct type backlight unit at a backside of the liquid crystal panel 110. So, the liquid crystal panel 110 receives light source of the backlight unit 120 from the backside thereof. The backlight unit 120 includes a plurality of fluorescent lamps 172 disposed in a row over on the bottom frame 160. A reflective sheet 170 is disposed under the fluorescent lamps 172 and on the first surface of the bottom frame 160. Each of both end portions of the fluorescent lamps 172 is covered with a side support 176. The side support 176 includes an opening 178 such that the end portion of the fluorescent lamp 172 passes through the side support 176 via the opening 178. Furthermore, a plurality of optical sheets 125 is disposed over the fluorescent lamps 172.

The PCB 180 is disposed on the bottom frame 160. The printed circuit board 180 includes first and second PCBs 180a and 180b extend along end portions of the bottom frame 160, respectively, as dummy spaces. Each of both end portions of each of the fluorescent lamps 172 is inserted into a lamp socket 174. Here, the lamp socket 174 corresponding to an end portion of the fluorescent lamp 172 is soldered on the first PCB 180a, and the lamp socket 174 corresponding to the other end portion of the fluorescent lamp 172 is soldered on the second PCB 180b. The lamp socket 174 can be attached to the first and second PCBs 180a and 180b by an auto attached method that is good in view of cost and stability in comparison with a hand-operated soldering method according to the related art. Specifically, since the lamp socket 174 is connected to each of the first and second printed circuit board (PCBs) 180a and 180b, each of both end portions of the fluorescent lamp 172 is inserted into the lamp socket 174 and is connected to the first and second printed circuit board (PCBs) 180a and 180b. That is, the lamp socket 174 can support the fluorescent lamp 172.

Figure 5:
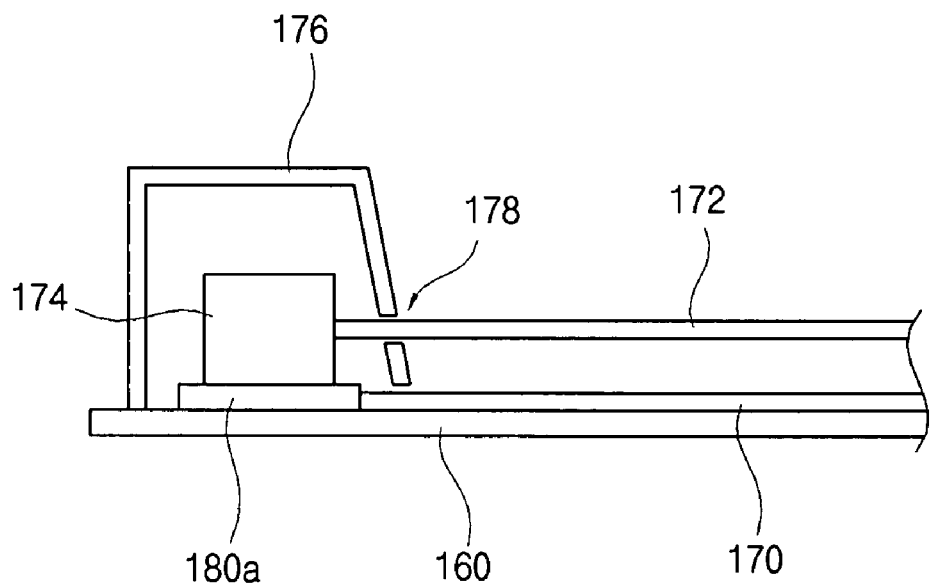
FIG. 5 is a cross-sectional view of a portion of a backlight unit according to an embodiment of the invention.

FIG. 5 is a cross-sectional view of a portion of a backlight unit according to an embodiment of the invention. As shown in FIG. 5, the PCB 180a is mounted on an end portion of the bottom frame 160 along an outside of the reflective sheet 170, and the side support 176 is combined to the bottom frame 160 so that the side support 176 cover the lamp socket 174 and the PCB 180a. When the reflective sheet 170 extends to the end portion of the bottom frame 160, the PCB 180a overlaps the reflective sheet 170. Here, the fluorescent lamp 172 passes through the side support 176 via the opening 178 of the side support 176.

Referring back to FIG. 4, the bottom frame 160 includes a hole 162. The hole 162 corresponds to the first PCB 180a. Another hole (not shown) corresponding to the second circuit board 180b is formed through the bottom frame 160. The inverter unit 140, which applies a power supply to the fluorescent lamp 172, is disposed under the bottom frame 160. The inverter unit 140 includes an inverter 144, the inverter connector 146 as a connector of the fluorescent lamp 172, and an inverter circuit board 142 on which the inverter 144 and the inverter connector 146 are mounted. A wire 186 extends from an end portion of the first PCB 180a to a backside of the bottom frame 160. The wire 186 connects the first PCB 180a and the inverter connector 146 on the inverter circuit board 142 through the hole 162 in the bottom frame 160. In addition, a PCB line (not shown) is formed on the circuit board 180 and connected to the fluorescent lamps 172 via the lamp socket 174. Because the first PCB 180a is connected to the end portion of the fluorescent lamp 172 through the lamp socket 174 and the PCB line (not shown) and the inverter 144 is connected to the inverter circuit board 142, the end portion of the fluorescent lamp 172 is connected to the inverter 144 via the wire 186. Although not shown, there is an other wire passing through an another hole (not shown), which corresponds to the second PCB 180b, in the bottom frame 160 and an other inverter unit (not shown) including an other second inverter (not shown). Accordingly, there is an other end portion of the fluorescent lamp 172 (not shown) that is connected to the other inverter via the other wire.

The liquid crystal display panel 110 and the backlight unit 120 are combined using the main frame 130 that can prevent movement of the liquid crystal panel 110 and the backlight unit 120. The top frame 135 cover edges of the liquid crystal panel 110 and sides of the main frame 130, so the top frame 135 can support and protect of the edges of the liquid crystal panel 110 and sides of the main frame 130. The bottom frame 160 covers back edges of the main frame 135, so the bottom frame 160 is combined with the main frame 130 and the top frame 135 for modulation.

A cover shield 150 protects the inverter unit 140. Accordingly, the backside of the bottom frame 160 and the cover shield 150 cover the inverter unit 140, thereby protecting the inverter unit 140 from external impact. Further, at least one of the bottom frame 160 and the cover shield 150 is made of a metallic material capable of protecting the inverter unit 140 from electromagnetic waves. Since the inverter 144 is mounted on the inverter circuit board 142, the inverter 144 faces the cover shield 150. The inverter circuit board 142 is combined with the cover shield 150 using a connector. The inverter unit 140 changes a power supply provided by an external power supply unit and applies the changed power supply to the fluorescent lamp 172.

FIG. 4 shows a backlight unit driven in a high-high mode. In the high-high mode, both end portions of the fluorescent lamp are connected to the inverters. On the other hand, when the backlight unit is driven in a high-low mode, an end portion of the fluorescent lamp is connected to ground. Accordingly, in the backlight unit driven in the high-low mode, a single inverter, a single circuit board and a single hole are required.

In particular, since the inverter unit 140 according to the invention can be connected to the PCB 180 through a small number of wires, the size of the inverter unit 140 can be reduced. Therefore, the size of the cover shield 150 can be reduced together with the inverter unit 140, thereby providing a compact and slim model.

While the inverter unit according to the related art includes a plurality of inverters corresponding to the plurality of fluorescent lamps, the inverter unit according to the invention includes a small number of inverters 144. Since the plurality of fluorescent lamps is connected to the PCB 180, the inverter unit 140 can be simply connected to the plurality of fluorescent lamps 172 through the PCB 180. In other words, the PCB 180 can simplify the connection structure of the plurality of fluorescent lamps 124 and the inverter unit 140. Therefore, the number of inverters 144 in the inverter unit 140 can effectively be reduced, thereby reducing the size of the inverter unit 140.

According to an embodiment of the invention, each of the plurality of fluorescent lamps 172 does not receive power from an individual wire. Rather, the plurality of fluorescent lamps 124 receive a power through the PCB line of the PCB 180, respectively. Moreover, since the wire 186 passes through the hole 162 and is, therefore, unexposed, leakage currents are prevented. Here, the shape of the lamp socket 174 may be variable to support and fix the fluorescent lamp 172.

Figure 6:
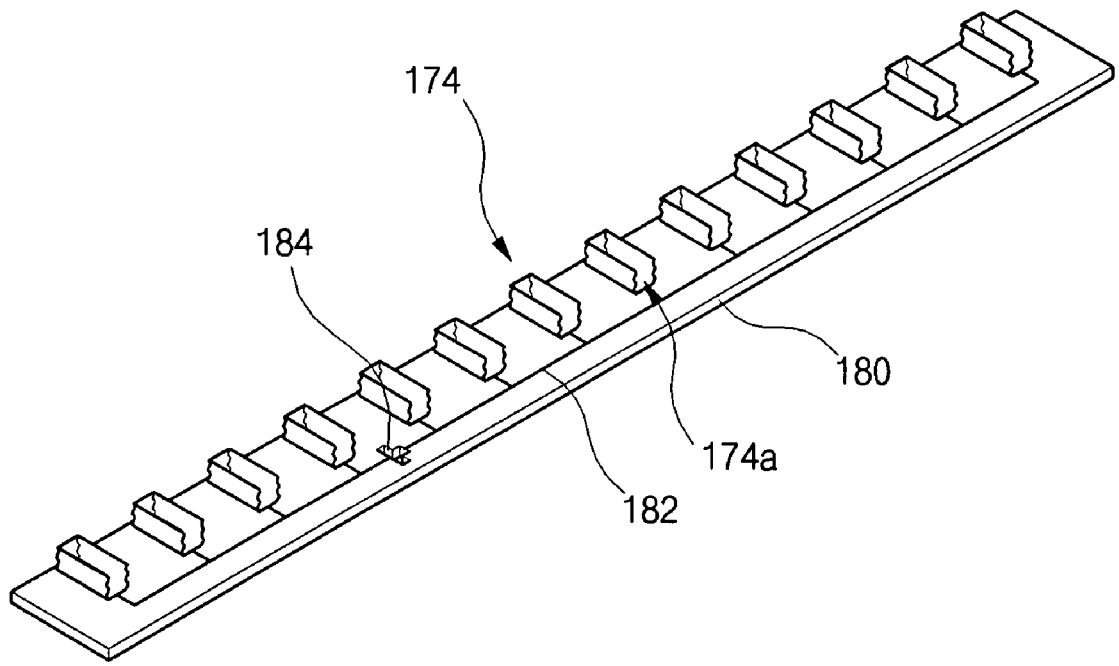
FIG. 6 is a perspective view of a printed circuit board (PCB) including a plurality of lamp sockets for a backlight unit according to an embodiment of the invention.
Figure 7:
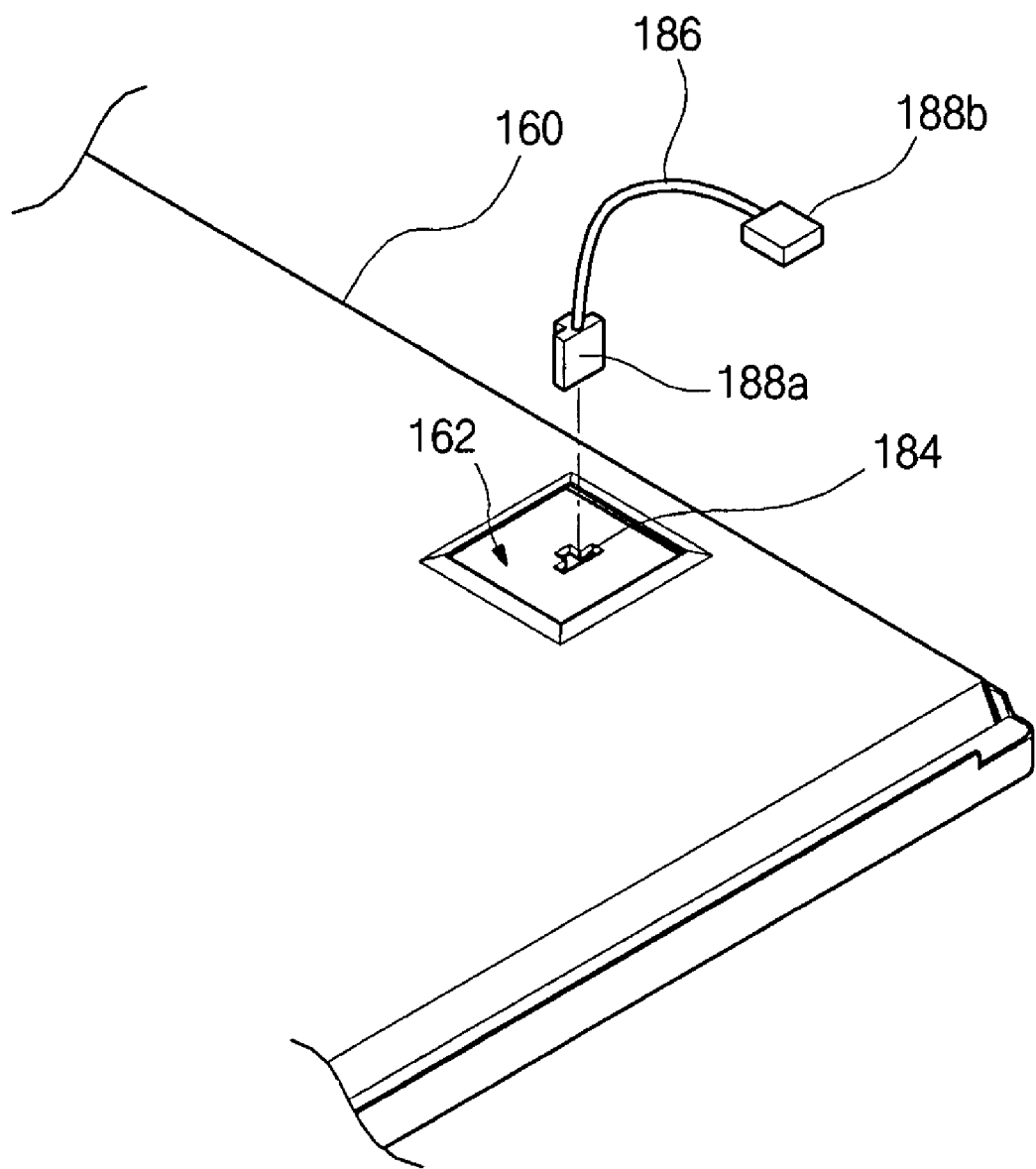
FIG. 7 is a partial view for a connection portion between a bottom frame and an inverter unit according to an embodiment of the invention.

FIG. 6 is a perspective view of a printed circuit board (PCB) including a plurality of lamp sockets for a backlight unit according to an embodiment of the invention, and FIG. 7 is a partial view for a connection portion between a bottom frame and an inverter unit according to an embodiment of the invention. Referring to FIGS. 6 and 7, a plurality of lamp sockets 174 are disposed in a row on the PCB 180. Each lamp socket 174 includes a guide groove 174a supporting and fixing a glass tube of the fluorescent lamp 172 of FIG. 5. Here, the lamp sockets 174 are soldered on the PCB 180. Further, a PCB line 182 extends from soldering portions of the lamp sockets 174 in a row. The PCB line 182 is connected to the plurality of fluorescent lamps 172 of FIG. 5 via the plurality of lamp sockets 174. Here, since the fluorescent lamp 172 of FIG. 5 includes an external electrode fluorescent lamp (EEFL), a balancing element, such as a capacitor, for balancing a current through each of the lamps is not required.

Referring to FIG. 7, a first hole 184 is formed in the PCB 180 so that the first hole 184 is overlapped with the PCB line 182. The bottom frame 160 has a second hole 162 corresponding to the first hole 184. A wire 186 is formed to connect the inverter unit 140 of FIG. 4 via the first and second holes 184 and 162. Specifically, a first connector 188a is connected to one end portion of the wire 186 so that the first connector 188a is connected to the PCB line 182 of FIG. 6 via the first hole 184, and a second connector 188b is connected to the other end portion of the wire 186 so that the wire 186 is connected to the inverter unit 140 of FIG. 4 via the second connector 188b. That is, the PCB 180 of FIG. 6 and the inverter PCB 142 of FIG. 4 can be connected using the wire 186. Moreover, since the fluorescent lamp 172 of FIG. 5 and the inverter 144 of FIG. 4 are connected to the PCB 180 of FIG. 6 and the inverter PCB 142 of FIG. 4, the fluorescent lamp 172 of FIG. 5 are connected to the inverter 144 of FIG. 4.

Referring to FIG. 4, since a large current flows through the wire 186, the size of the second hole 162 of the bottom frame through which the wire 186 passes is determined considering a distance with respect to the wire 186. That is, according to the backlight unit of the invention, simplification of the process and reduction of the cost can be expected because the PCB line 182 on the PCB 180 and a single wire 186 connecting the PCB 180 to the inverter 144 of FIG. 4.

Figure 8:
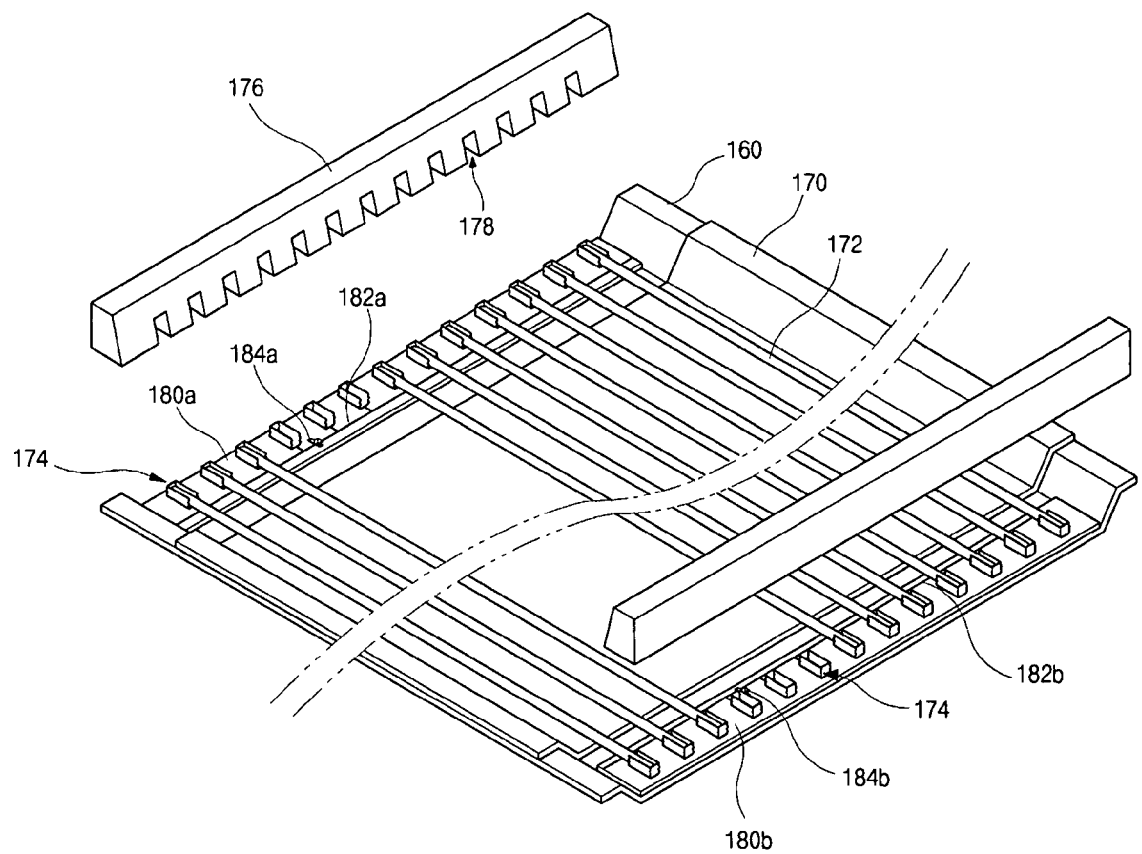
FIG. 8 is a perspective view of a backlight unit according to an embodiment of the invention.
Figure 9:
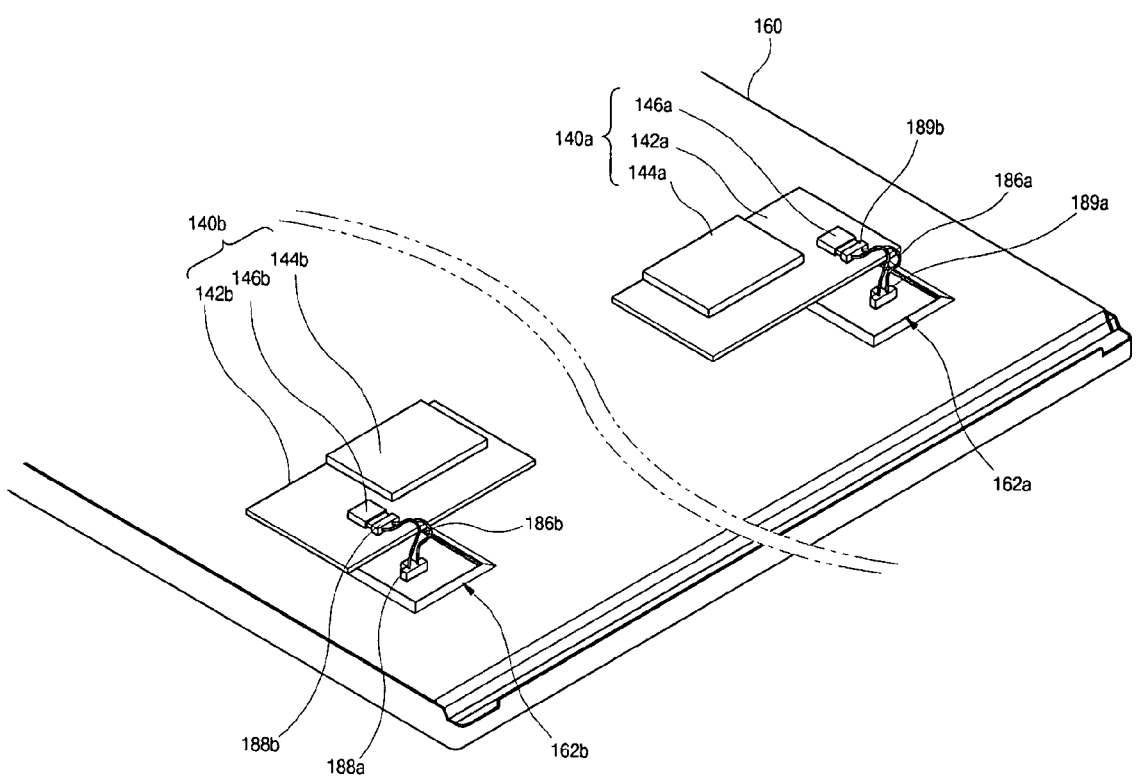
FIG. 9 is a perspective view of an inverter unit attached to a backlight unit according to an embodiment of the invention.

FIG. 8 is a perspective view of a backlight unit including according to an embodiment of the invention, and FIG. 9 is a perspective view of an inverter unit attached to a backlight unit according to an embodiment of the invention. Referring to FIGS. 8 and 9, a plurality of fluorescent lamps 172 are disposed in a row on a reflective sheet 170 disposed on a bottom frame 160. First and second PCBs 180a and 180b are disposed at one end portion and the other end portion of the bottom frame 160. A plurality of lamp sockets 174 are disposed in a row and on the first and second PCBs 180a and 180b. Here, one end and the other end of each fluorescent lamp 172 are inserted into each of the plurality of lamp sockets 174, respectively, to be stably mounted on the bottom frame 160. First and second PCBs 180a and 180b including the plurality of lamp sockets 174 in a row and are disposed at the end portions of the bottom frame 160 so that the first and second PCBs 180a and 180b are connected to first and second inverter units 140a and 140b with a minimum distance. The first and second PCBs 180a and 180b are attached to the bottom frame 160 using a connector, respectively. A side support 176 including a plurality of openings 178, which respectively correspond to each of the plurality of fluorescent lamps 172, is attached to the bottom frame 160 by covering the PCBs 180a and 180b so that each of the fluorescent lamps 124 passes through the openings 178.

Moreover, first and second PCB lines 182a and 182b are formed on the first and second PCBs 180a and 180b, respectively. The first PCB line 182a on the first PCB 180a is connected to the end of the lamp sockets 174 on the first PCB 180a, and the second PCB line 182b on the second PCB 180b is connected to the end of the lamp sockets 174 on the second PCB 180b. That is, the first and second PCB lines 182a and 182b on the first and second printed circuit boards (PCB) 180a and 180b are connected to ends of each fluorescent lamp 172, respectively. A first hole 184a is formed in the first PCB 180a and corresponds to the first PCB line 182a on the first PCB 180a. Similarly, a second hole 184b is formed in the second PCB 180b and corresponds to the second PCB line 182b on the second PCB 180b.

As shown in FIG. 9, first and second inverter units 140a and 140b are disposed at a backside of the bottom frame 160. The first and second inverter units 140a and 140b include a first inverter PCB 142a, a first inverter 144a and a first inverter connector 146a, and a second inverter PCB 142b, a second inverter 144b and a second inverter connector 146b, respectively. Third and fourth holes 162a and 162b are formed in the bottom frame 160. The third and fourth holes 162a and 162b correspond to the first and second holes 184a and 184b in the first and second PCBs 180a and 180b, respectively. In this case, the first and second inverter PCBs 142a and 142b are connected to the first and second PCB lines 182a and 182b via first and second wires 186a and 186b, respectively. In more detail, the first wire 186a includes first and second connectors 189a and 189b at both ends thereof and the second wire 186b includes first and second connectors 188a and 188b at both ends thereof. The first connector 189a of the first wire 186a is connected to the first PCB line 182a of the first PCB 180a through the first and third holes 184a and 162a, and the second connector 189b of the first wire 186a is combined with the first inverter connector 146a to be connected to the first inverter PCB 142a. Since the one end of each of the fluorescent lamps 172 and the first inverter 144a are respectively connected to the first PCB lines 182a of the first PCB 180a and the first inverter PCB 142a, the one end of each of the fluorescent lamps 172 is electrically connected to the first inverter 144a through the first wire 186a. Similarly, the first connector 188a of the second wire 186b is connected to the second PCB line 182b of the second PCB 180b through the second and fourth holes 184b and 162b, and the second connector 188b of the second wire 186b is combined with the second inverter connector 146b to be connected to the second inverter PCB 142b. Since the other end of each of the fluorescent lamps 172 and the second inverter 144b are respectively connected to the second PCB line 182b of the second PCB 180b and the second inverter PCB 142b, the other end of each of the fluorescent lamps 172 is electrically connected to the second inverter 144b through the second wire 186b.

FIGS. 8 and 9 show a backlight unit driven in a high-high mode. Accordingly, both end portions of the fluorescent lamp 172 are connected to the inverters 140a and 140b. However, when the backlight unit is driven in a high-low mode, only one end portion of the fluorescent lamp is connected to the inverter.

Figure 10A:
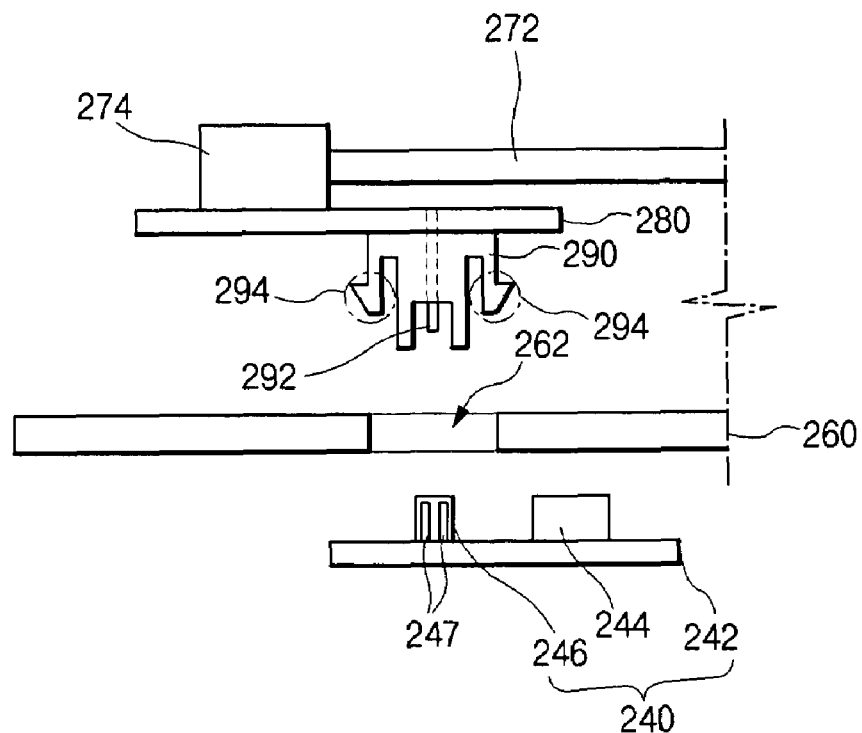
FIGS. 10A and 10B are schematic cross-sectional views showing a portion of a backlight unit having a socket type connector according to an embodiment of the invention, respectively.
Figure 10B:
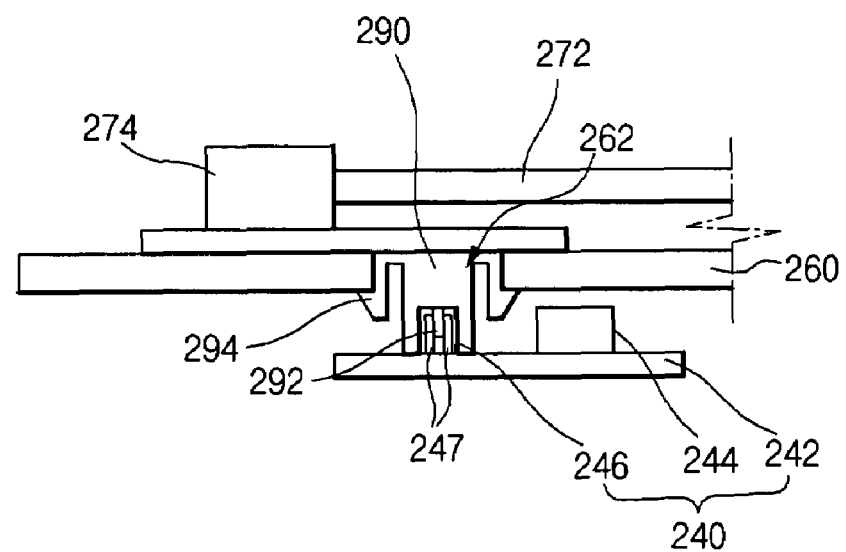

FIGS. 10A and 10B are schematic cross-sectional views showing a portion of a backlight unit having a socket type connector according to an embodiment of the invention, respectively. Referring to FIG. 10A, a fluorescent lamp 272 is disposed on a bottom frame 260. One end portion of the fluorescent lamp 272 is inserted into a lamp socket 274. The lamp socket 274 is disposed in a row and on a PCB 280. In FIG. 10A, the PCB 280 is spaced apart from the bottom frame 260 to show the socket type connector before connecting. Once connected, the PCB 280 is disposed on the bottom frame 260. Although a single fluorescent lamp and a single lamp socket are shown in FIG. 10A, the configuration of FIG. 10A applies to each of the plurality of fluorescent lamps and lamp sockets shown in FIG. 8. Moreover, a PCB line connected to the plurality of fluorescent lamp via the plurality of lamp sockets is formed on the PCB 280. A first connector 290 including a hook 294 and a first conductive pin 292 is formed on a backside of the PCB 280. Namely, the lamp socket 274 and the first connector 290 are disposed on opposing surfaces of the PCB 280, respectively. The first connector 290 corresponds to a hole 262 in the bottom frame 260 and the PCB line (not shown) on the PCB 280. Moreover, the first conductive pin 292 of the first connector 290 is connected to the PCB line (not shown) on the PCB 280. That is, the first conductive pin 292 of the first connector 290 is connected to the fluorescent lamp 272 via the PCB line (not shown) and the lamp socket 274.

An inverter unit 240, including an inverter PCB 242, an inverter 244 and a second connector 246, is disposed on a backside of the bottom frame 260. The second connector 246 is connected to the inverter 244 and corresponds to the hole 262 in the bottom frame 260. The second connector 246 includes a pair of second conductive pins 247. The first conductive pin 292 of the first connector 290 corresponds to a space between the pair of the second conductive pins 247 of the second connector 246.

Referring to FIG. 10B, the first and second connectors 290 and 246 are combined to each other to connect the fluorescent lamp 272 to the inverter 244. In more detail, the first and second connectors 290 and 246 contact each other through the hole in the bottom frame 260. When the first and second connectors 290 and 246 contact each other, the first conductive pin 292 of the first connector 290 is inserted into the pair of the second conductive pins 247 of the second connector 246 to be electrically connected. Furthermore, the hook 294 of the first connector 290 passes through the hole 262 in the bottom frame 260 and is hooked on a backside of the bottom frame 260. As a result, the fluorescent lamp 272 is connected to the inverter 244.

In FIGS. 10A and 10B, the fluorescent lamp 272 is connected to the inverter 244 with a minimum distance due to the first and second sockets. Moreover, since the PCB 280 is attached to the bottom frame 260 with the hook 294, there is no additional process for attaching the PCB 280 to the bottom frame 260.

Figure 11:
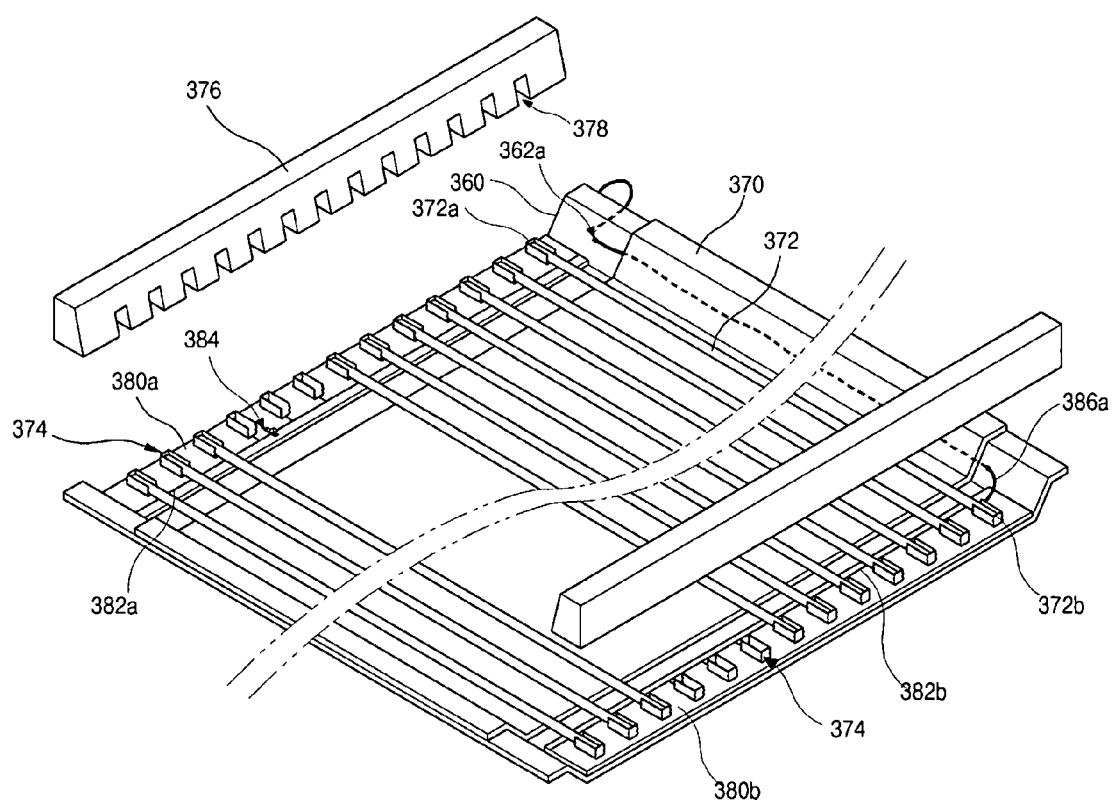
FIG. 11 is a perspective view of a backlight unit being including a PCB according to an embodiment of the invention.
Figure 12:
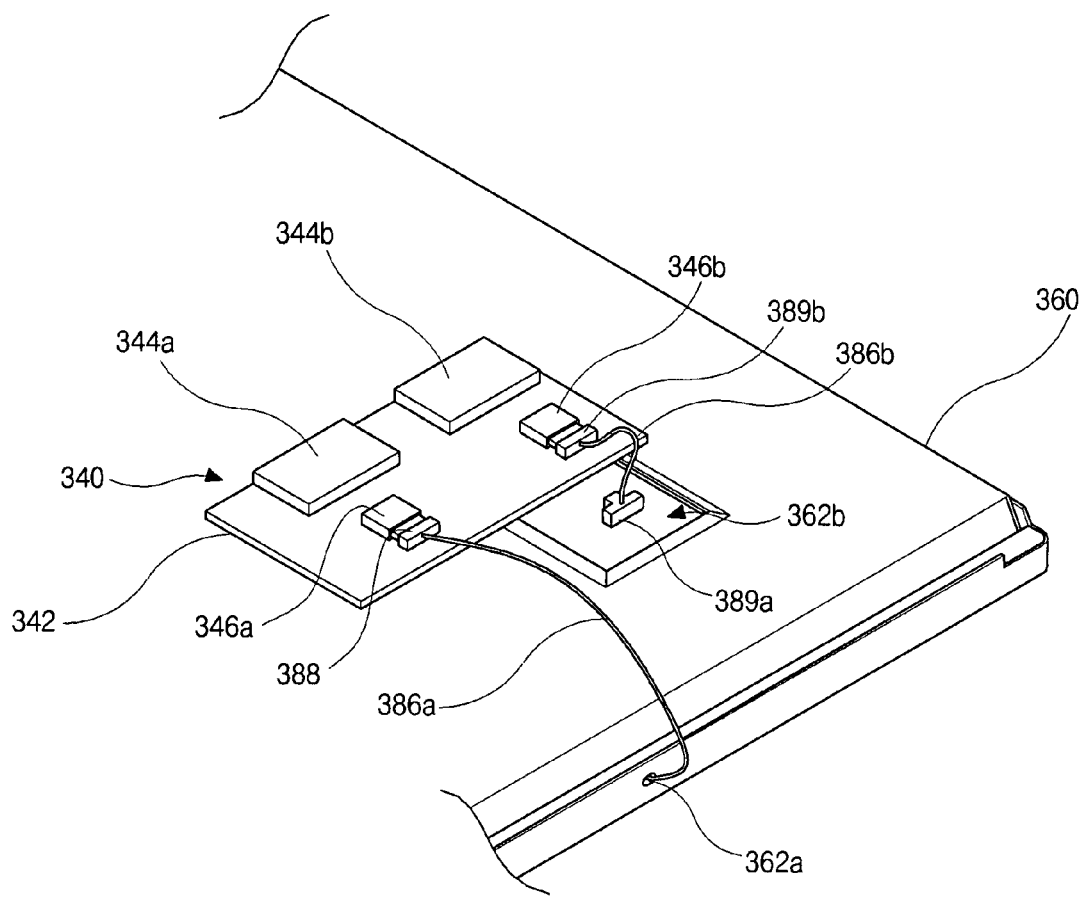
FIG. 12 is a perspective view of an inverter unit attached to a backlight unit according to an embodiment of the invention.

FIG. 11 is a perspective view of a backlight unit being including a PCB according to an embodiment of the invention, and FIG. 12 is a perspective view of an inverter unit attached to a backlight unit according to an embodiment of the invention.

Referring to FIGS. 11 and 12, a plurality of fluorescent lamps 372 are disposed over the bottom frame 360. A reflective sheet 370 is disposed on the bottom frame 360 to be disposed between each fluorescent lamp 372 and the bottom frame 360. First and second PCBs 380a and 380b are connected to the first and second end portions 372a and 372b of each of the fluorescent lamps 372, respectively. A plurality of lamp sockets 374 support the fluorescent lamps 372 and are disposed in rows on the first and second PCBs 380a and 380b. Each of the first and second end portions 372a and 372b of each of the fluorescent lamps 372 are inserted into a lamp socket 374 and soldered in place, as shown in FIG. 11. Since the lamp socket 374 is connected to each of the first and second PCBs 380a and 380b and each of the first and second end portions 372a and 372b of each of the fluorescent lamps 372 is inserted into the lamp sockets 374 such that each of the first and second end portions 372a and 372b of each of the fluorescent lamps 372 is connected to the first and second printed circuit board (PCBs) 380a and 380b, respectively. Each of the first and second end portions 372a and 372b of each of the fluorescent lamps 372 is covered with a side support 376. The side support 376 includes a plurality of openings 378 such that the end portion of the fluorescent lamp 372 passes through the side support 376 via the plurality of openings 378. The side support 376 has an inner space where the lamp socket 374 is disposed. The concrete shape of the side support 376 is explained with FIG. 5.

A first PCB line 382a is formed on the first PCB 380a along a length direction thereof. The first PCB line 382a is connected to all of the plurality of lamp sockets 374 on the first PCB 380a. As a result, each of the first end portions 372a of each of the fluorescent lamps 372 is connected to the first PCB line 382a via lamp sockets 374. In addition, a first hole 384 corresponding to the first PCB line 382a is formed in the first PCB 380a.

A second PCB line 382b is formed along the length of the second PCB 380b. The first and second PCB lines 382a and 382b are parallel to each other. The second PCB line 382b is connected to all of the plurality of lamp sockets 374 on the second PCB 380b. As a result, each of the second end portions 372b of each of the fluorescent lamps 372 is connected to the second PCB line 382b via lamp sockets 374. Unlike in the case of the first PCB 382a, in the second PCB 382b there is no hole. A first wire 386a is connected to the second PCB line 382b. The first wire 386a extends from the second PCB line 382b along a length direction of the fluorescent lamp 372 through an inner edge of the bottom frame 360 and by passing through a second hole 362a of the bottom frame 360 adjacent to the first hole 384 of the first PCB 380a. In more detail, the first wire 386a passes between the bottom frame 360 and the reflective sheet 370 and extends to a backside of the bottom frame 360 through the second hole 362a.

As shown in FIG. 12, a single inverter unit 340 is disposed at a backside of the bottom frame 360. A third hole 362b corresponding to the first hole 384 of FIG. 11 is formed in the bottom frame 360. The second hole 362a of FIG. 11 is adjacent to both the first and third holes 384 of FIG. 11 and 362b, and the inverter unit 340 is adjacent to both the second and third holes 362a and 362b in the bottom frame 360. The inverter unit 340 includes an inverter PCB 342, first and second inverters 344a and 344b, and first and second inverter connectors 346a and 346b. The inverters 344a and 344b and the inverter connectors 346a and 346b are disposed on the inverter PCB 342, and the first and second inverters 344a and 344b are connected to the first and second inverter connectors 346a and 346b, respectively. As mentioned above, the first wire 386a passes through the second hole 362a and is connected to the inverter unit 340. In more detail, the first wire 386a includes a first connector 388 at one end thereof, and the first connector 388 is combined to a first inverter connector 346a. Since the first inverter connector 346a is connected to the first inverter 344a, the first wire 386a is connected to the first inverter 344a via the first connector 388 and the first inverter connector 346a. As a result, the second end portion 372b of the fluorescent lamp 372 of FIG. 11 is connected to the first inverter 344a via the lamp socket 374 of FIG. 11, the second PCB line 382b of FIG. 11, the first wire 386a and the first inverter connector 346a.

A second wire 386b including second and third connectors 389a and 389b at both ends thereof connects the first PCB line 382a to the second inverter 344b. The second connector 389a passes through the first and third holes 384 of FIG. 11 and 362b of FIG. 11 to be connected to the first PCB line 382a of FIG. 11 on the first PCB 380a of FIG. 11. The third connector 389b is combined to the second inverter connector 346b. Since the second inverter connector 346b is connected to the second inverter 344b, the second wire 386b is connected to the second inverter 344b via the third connector 389b and the second inverter connector 346b. As a result, the first end portion 372a of the fluorescent lamp 372 is connected to the second inverter 344b via the lamp socket 374, the first PCB line 382a, the second wire 386b and the second inverter connector 346b.

Consequently, each of the second end portions 372b of each of the fluorescent lamps 372 is connected to the same inverter unit 340. Therefore, production cost is reduced relative to that for a backlight unit having two inverter units at both sides.

In FIG. 12, the two holes in the bottom frame are adjacent to each other. When two holes are disposed at both end of the bottom frame, as shown in FIG. 9, however, it is still possible for each of the second end portions 372b of each of the fluorescent lamps 372 to be connected to a single inverter unit. In this case, at least one wire extends from a hole to the inverter unit on a backside of the bottom frame (not shown). Since the wire (not shown) is exposed, an electric interference or current leakage may occur. In contrast, the configuration sown in FIG. 12 has the first wire 386a passing through the second hole 362a in the bottom frame 360 and adjacent to the third hole 362b. Therefore, there is no problem of the electric interference or current leakage. Furthermore, it is also possible to connect the second inverter 344b to the first inverter PCB line 382a on the first PCB 380a by the socket type connector, as shown in FIGS. 10a and 10b.

Figure 13:
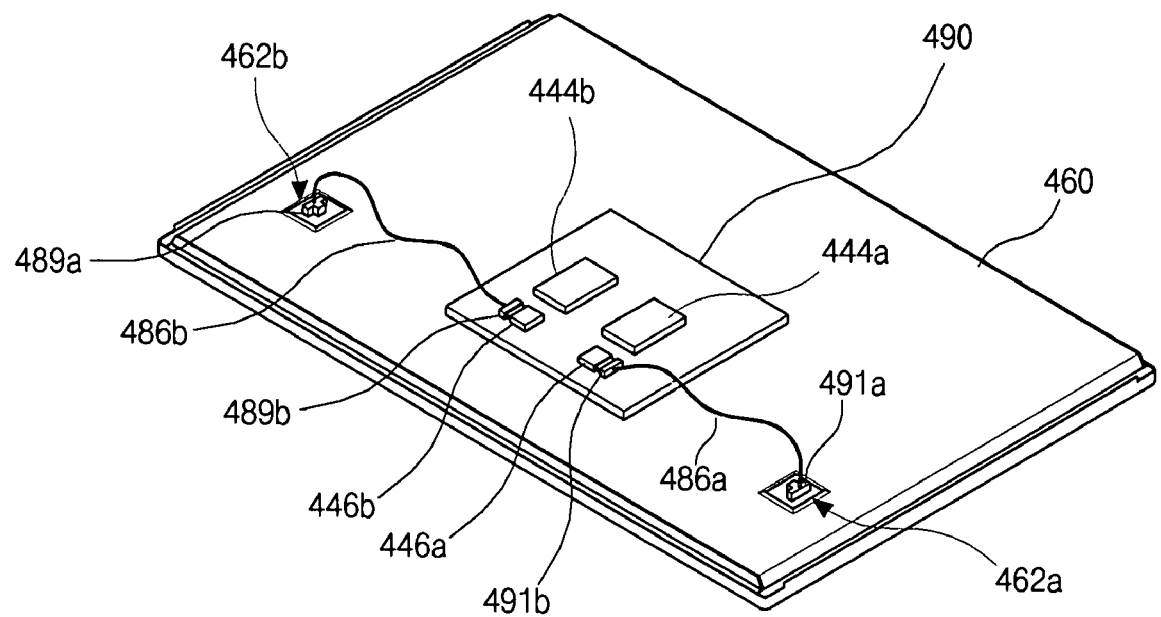
FIG. 13 is a perspective view showing a LCDM according to an embodiment of the invention.

FIG. 13 is a perspective view showing a LCDM according to an embodiment of the invention. In the LCDM in FIG. 13, there is no inverter PCB such that the process time and the process cost are reduced.

Referring back to FIG. 4, the LCDM includes the liquid crystal panel 110, the backlight unit 120, the main frame 130, the top frame 135, and the bottom frame 160, and the cover shield 150. In contrast to the LCDM of FIG. 4, the LCDM of FIG. 13 does not include the inverter PCB 142. Moreover, the backlight unit 120 of FIG. 4 includes the bottom frame 160 of FIG. 8, the reflective sheet 170, the plurality of fluorescent lamps 172, the first and second PCBs 180a and 180b, the plurality of lamp sockets 174, and the side support 176. The reflective sheet 170 is disposed on the bottom frame 160, and the plurality of fluorescent lamps 172 is disposed in a row and on the reflective sheet 170. The first and second PCBs 180a and 180b are disposed at both end portions of the bottom frame 160, respectively, and the plurality of lamp sockets 174 are disposed on each of the first and second PCBs 180a and 180b. Each lamp socket 174 is connected to each of the first and second end portions 372a and 372b of each of the fluorescent lamps 372. The side support including the plurality of openings 178, which correspond to each of the plurality of fluorescent lamps 172, is attached to the bottom frame 160 by covering the first and second PCBs 180a and 180b so that each of the fluorescent lamps 172 passes through the plurality of openings 178. The plurality of optical sheets 125 of FIG. 4 are disposed over the fluorescent lamps 172.

Referring again to FIG. 8, the first and second PCB lines 182a and 182b are also formed on the first and second PCBs 180a and 180b, respectively, and the first and second holes 184a and 184b are also formed on the first and second PCBs 180a and 180b, respectively. Here, the first and second PCB lines 182a and 182b are respectively connected to the lamp sockets 174 on the first and second PCBs 180a and 180b. Each of the first and second end portions 372a and 372b of each of the fluorescent lamps 372 is connected to the first and second PCB lines 182a and 182b, respectively. Moreover, the first and second holes 184a and 184b correspond to the first and second PCB lines 182a and 182b, respectively.

Referring to FIG. 13, a power supplying unit 490 is disposed on a backside of a bottom frame 460, and third and fourth holes 462a and 462b, which respectively correspond to the first and second holes 184a and 184b of FIG. 8, are formed in the bottom frame 460. For example, the power supplying unit 490 may be disposed at a center portion of the backside of the bottom frame 460. The power supplying unit 490 supplies power sources to the liquid crystal panel 110 of FIG. 4. In addition, the first and second inverters 444a and 444b, and the first and second inverter connectors 446a and 446b are disposed on the power supplying unit 490. The first and second inverters 444a and 444b are connected to the first 372a and second 372b end portions 372a and 372b of each of the fluorescent lamps 372 of FIG. 8, respectively, to supply a power source. In more detail, a first wire 486a including first and second connectors 491a and 491b at both end portions thereof connects the first PCB line 182a of FIG. 8 to the first inverter 444a. The first connector 491 a is combined to the first PCB line 182a of FIG. 8 through the first and third holes 184a of FIG. 8 and 462a, and the second connector 491b is combined to the first inverter connector 446a. Since the first PCB line 182a of FIG. 8 and the first inverter connector 446a are connected to the first end portion 372a of the fluorescent lamp 172 of FIG. 8 and the first inverter 444a, respectively, the first end portion 372a of the fluorescent lamp 172 of FIG. 8 is connected to the first inverter 444a on the power supplying unit 490 via the first PCB line 182a of FIG. 8, the first wire 486a and the first inverter connector 446a. Similarly, a second wire 486b including first and second connectors 489a and 489b at both end portions thereof connects the second PCB line 182b of FIG. 8 to the second inverter 444b. The first connector 489a of the second wire 486b is combined to the second PCB line 182b of FIG. 8 through the second and fourth holes 184b of FIG. 8 and 462b, and the second connector 489b of the second wire 486b is combined to the second inverter connector 446b. Since the second PCB line 182b of FIG. 8 and the second inverter connector 446b are connected to the second end portion 372b of the fluorescent lamp 172 of FIG. 8 and the second inverter 444b, respectively, the second end portion 372b of the fluorescent lamp 172 of FIG. 8 is connected to the second inverter 444b on the power supplying unit 490 via the second PCB line 182b of FIG. 8, the second wire 486b and the second inverter connector 446b.

When the backlight unit is driven in the high-low mode, a single inverter is disposed on the power supplying unit.

In the LCDM in FIG. 13, since the inverters 444a and 444b, and the inverter connectors 446a and 446b are formed on the power supplying unit 490 without an inverter PCB, the process time and the process cost are reduced.

In accordance with an embodiment of the invention, a PCB line is disposed to connect the plurality of fluorescent lamps using the PCB line. Further, since the fluorescent lamps are connected to the lamp sockets in a row, the number of inverters and the wires can be reduced compared to the related art. Individually soldering each of the fluorescent lamps to each of the wires is no longer necessary, therefore the process time, cost and possibility of the defects are all reduced.

In accordance with an embodiment of the invention, a wire connects the PCB and the inverter PCB through the first hole of the PCB and the second hole of the bottom frame, thereby preventing a current leakage. Furthermore, since the lamp socket supports the fluorescent lamp, additional lamp holder can be omitted. Therefore, the process time and cost can be effectively reduced.

Since the PCB is mounted between the inner surface of the bottom frame and the side support, the space between the inner surface of the bottom frame and the side support is used more efficiently. Furthermore, the size of the cover shield together with the size of the inverter unit is reduced, thereby providing much compacter and slimmer model than the related art. Moreover, in a high-high mode wires passing through the first and second hole in the bottom frame are connected to a single inverter PCB. Since one of the wires is shielded by the reflective sheet, current leakage is prevented. In addition, since the fluorescent lamps include an external electrode fluorescent lamp (EEFL), there is no need for additional elements for balancing current. Further, since both end portions of the fluorescent lamp are connected to the inverters on the power supplying unit supplying power to the liquid crystal panel, there is no need for an additional inverter PCB. Accordingly, the processing time and the processing cost is reduced.

It will be apparent to those skilled in the art that various modifications and variations can be made in the exemplary embodiments of the LCDM without departing from the spirit or scope of the invention. Thus, it is intended that the invention cover the modifications and variations of this invention provided they come within the scope of the appended claims and their equivalents.

What is claimed is:

1. A backlight unit for a display device, comprising:
a frame;
a first circuit board extending along one end of and on a first surface of the frame;
a second circuit board extending along an other end of and on the first surface of the frame;
lamps over the frame, one end of each of the lamps disposed on the first circuit board and another end of the lamps disposed on the second circuit board;
a first line on the first circuit board and connected to the one end of each of the lamps;
a second line on the second circuit board and connected to the other end of each of the lamps;
a first inverter on a second surface of the frame and connected to the first line via a first hole through the frame; and
a second inverter on the second surface of the frame and connected to the second line via a second hole through the frame,
wherein the first and second holes are respectively disposed at the one end of the frame, wherein the first and second inverters are positioned at the one end of the frame.

2. The backlight unit of claim 1, wherein the first inverter is connected to the first line through a third hole in the first circuit board overlapping the first hole.

3. The backlight unit of claim 2, wherein the second inverter is connected to the second line through a fourth hole in the second circuit board and overlapping the second hole.

4. The backlight unit of claim 3, wherein the first and second inverters are respectively connected to the first and second lines by first and second wires.

5. The backlight unit of claim 1, further comprising a plurality of sockets attached to the first circuit board for connecting the lamps, each of the plurality of sockets connected to the first line.

6. The backlight unit of claim 1, further comprising a first wire extending from the second line and passing through the second hole to connect the second line to the second inverter.

7. The backlight unit of claim 6, further comprising a reflective sheet on the first surface of the frame and under the lamps.

8. The backlight unit of claim 7, wherein the first wire extends and passes between the frame and the reflective sheet.

9. The backlight unit of claim 6, further comprising a second wire connecting the first line to the first inverter via a third hole in the first circuit board and overlapping the first hole.

10. The backlight unit of claim 6, wherein the first circuit board includes a first conductive pin protruding from the first circuit board, and the first inverter includes a second conductive pin protruding from the first inverter, wherein the first conductive pin and the second conductive pin contact each other through the first hole.

11. The backlight unit of claim 1, wherein the first circuit board includes a first conductive pin protruding from the first circuit board, and the first inverter includes a second conductive pin protruding from the first inverter, wherein the first conductive pin and the second conductive pin contact each other through the first hole.

12. The backlight unit of claim 1, wherein each of the lamps includes an external electrode fluorescent lamp.

13. The backlight unit of claim 1, further comprising a support attached to the frame, the support covering the first circuit board and the one end of each of the lamps.

14. The backlight unit of claim 13, wherein the support includes a plurality of openings, and where each of the lamps passes through corresponding one of the plurality of openings.

15. The backlight unit of claim 1, further comprising a cover for shielding the first inverter.

16. A liquid crystal display module, comprising:
a liquid crystal panel;
a backlight unit for projecting light on the liquid crystal panel, the backlight unit including:
a first frame;
a first circuit board extending along one end of and on a first surface of the first frame;
a second circuit board extending along an other end of and on the first surface of the frame;
lamps over the first frame, one end of each of the lamps is disposed on the first circuit board and another end of the lamps disposed on the second circuit board;

a first line on the first circuit board and connected to the one end of each of the lamps;

a second line on the second circuit board and connected to the other end of each of the lamps;

a first inverter on a second surface of the frame and connected to the first line via a first hole through the first frame;

a second inverter on the second surface of the frame and connected to the second line via a second hole through the frame; and a power supplying unit on a second surface of the first frame for supplying power to the liquid crystal panel, wherein the first and second inverters are disposed on the power supplying unit, and wherein the first and second holes are respectively disposed at the one end of the frame, and wherein the first and second inverters are positioned at the one end of the frame.

17. The liquid crystal display module of claim 16, further comprising an optical sheet over the lamps.

18. The liquid crystal display module of claim 17, further comprising a second frame surrounding the optical sheet and attached to the first frame and a third frame surrounding an edge of the liquid crystal panel and attached to the first and second frames.

* * * * *